Patented Dec. 3, 1929

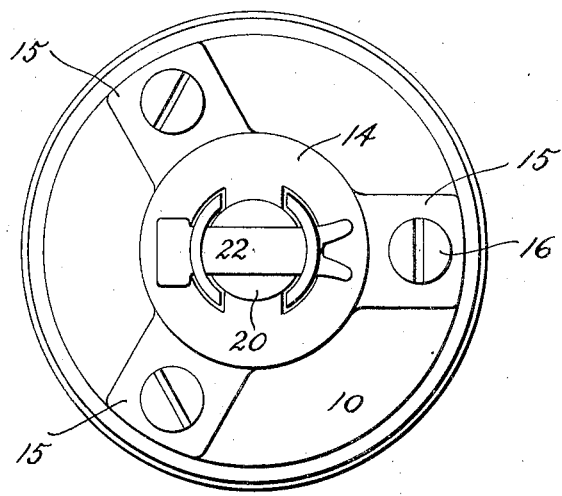
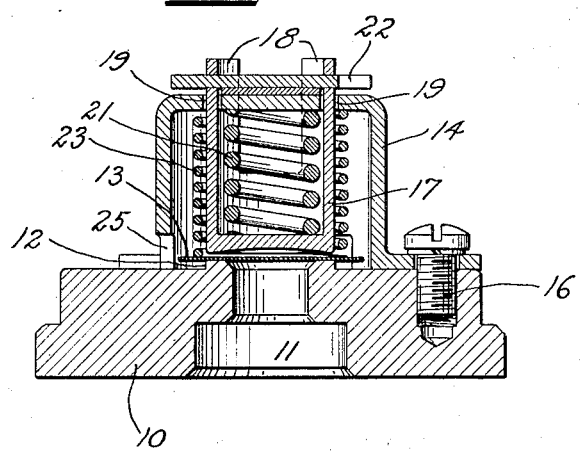

1,737,706

UNITED STATES PATENT OFFICE

WILLIAM D. COLLINS, OF EVANSVILLE, INDIANA, ASSIGNOR TO SERVEL, INC., OF NEW YORK, N. Y., A CORPORATION OF DELAWARE

VALVE

Application filed May 4, 1928. Serial No. 275,134.

My invention relates to discharge valves for compressors and has for its object to provide a novel, compact, efficient valve of positive action comprising a member movable within a given range for certain normal pressures and having a movement beyond such range for conditions which may be termed abnormal.

The invention will be described with reference to the accompanying drawing showing the novel valve. On the drawing:

Fig. 1 is a plan view and Fig. 2 is a vertical cross-section of my new valve.

A plate 10 adapted to be used at the upper end of a compressor cylinder serves as a base plate for the valve. A central port 11 serves as a discharge port for the compression chamber. Extending upwardly from the base plate and surrounding the port is a boss 12, the upper side of which is finished to form a flat valve seat. A valve element, preferably a disk, 13 sits on the seat. A fixed outer member or abutment member 14 sits like a hat over the valve, enclosing the valve structure as a whole. This outer member has three equally spaced lugs 15 having holes therein through which extend studs 16 which firmly secure the outer member to the base plate.

Within the outer member is a cup shaped member 17 having a dished bottom and having oppositely disposed vertical projections 18 projecting through apertures 19 in outer member 14. The projections have holes in them through which a transverse retaining member 22 extends. This retaining member which is made somewhat like a cotter pin is outside of outer member 14 and is separated therefrom by a disk or spacing member 20.

A relatively heavy spring 21 is placed inside cup member 17 and exerts a force downwardly against the bottom of the cup. The upper end of spring 21 abuts against outer member 14. Member 22 prevents downward movement of cup member 17 beyond a fixed point because when member 22 is in contact with disk 20 and disk 20 is in contact with outer member 14 there can be no further downward movement of cup member 17.

A light spring 23 encircles cup member 17 within the annular space formed between the cup member and the outer member 14. This spring abuts against the outer member and abuts against valve disk 13.

Disk 20 is of such thickness and the parts are otherwise so made and arranged that the bottom of cup member 17, when in its lowermost position is a fixed distance above valve disk 13 when the valve disk is down on its seat. Obviously disk 20 may be omitted and the parts altered accordingly to give a normal fixed distance between the seated valve disk and the bottom of member 17.

A closed head (not shown) surrounds the valve structure. Ports 25 are provided in outer member 14 to permit passage of compressed fluid.

In operation: In normal discharge, valve disk 13 moves between the seat and cup member 17 but cup member 17 does not move. The relatively light spring 23 reacts against the lift of the valve disk and takes care of normal lifts. Should there be an unusual lift of the valve disk as when liquid is carried through the compressor so that the lifting force becomes greater than the reactive force of spring 23, then spring 21 yields and cup member 17 is moved upwardly to give a greater valve opening.

Disk 20, or rather a series of disks 20 of various thicknesses, constitutes a means for adjusting the normal range of lift of valve element 13. It is preferable that the lift of the valve be adjustable due to uncontrollable variations in manufacture and in order to accommodate the same valve structure to aggregrates of different capacities.

It will be apparent that variations in the structure may be made without departing from the spirit or scope of the invention.

What I claim is:

1. A valve structure having a port and a valve seat, a valve element adapted to close said seat, a stationary outer member arranged over said valve element and seat, said outer member having pasages through the same, a cup member above said valve element and within said outer member having projections extending through passages in the outer member, a relatively stiff spring within the cup member tending to move the cup member downwardly, a relatively light spring around the cup member and within the outer member and bearing against the valve element and means for limiting downward movement of the cup member to provide spacing above the valve element when seated.

2. A valve structure having a port and a valve seat therefor, a valve element adapted to close said seat, a stationary outer member arranged over said valve element and seat, said outer member having a pair of arcuate slots through the top of the same, a cup member above said valve element and within said outer member having vertical projections extending through and movable within said slots, a relatively stiff spring within the cup member tending to move the cup member downwardly and being arranged to abut against said outer member, a relatively light spring around the cup member and within the outer member and bearing against the valve element and means for limiting downward movement of the cup member to provide spacing above the valve element when seated.

3. A valve structure having a port and a valve seat therefor, a valve element adapted to close said seat, a stationary outer member arranged over said valve element and seat, said outer member having a pair of arcuate slots through the top of the same, a cup member above said valve element and within said outer member having vertical projections extending through and movable within said slots, a relatively stiff spring within the cup member tending to move the cup member downwardly and being arranged to abut against said outer member, a relatively light spring around the cup member and within the outer member and bearing against the valve element and means comprising a transverse member for limiting downward movement of the cup member to provide spacing above the valve element when seated.

4. A valve structure having a port and a seat therefor, a valve element adapted to close said seat, a stationary outer member arranged over said valve element and seat, a cup member over said valve element, a relatively heavy spring extending between said outer member and said cup member, a relatively light spring extending between said outer member and said valve element, said springs being arranged beside each other and means for limiting downward movement of the cup member.

5. A valve structure having a port and a seat therefor, a valve element adapted to close said seat, a stationary outer member arranged over said valve element and seat, a cup member over said valve element, a relatively heavy spring extending between said outer member and said cup member, a relatively light spring extending between said outer member and said valve element, said springs being arranged beside each other and means comprising a member engaging both the cup member and the outer member for limiting downward movement of the cup member.

6. A valve structure comprising a hollow cylindrical outer member having an end piece at one end and the other end open, a second smaller inner cylindrical member having an end piece at one end and its other end open and projections at its other end, the outer member having passages in its end piece adapted for movement of said projections therethrough, said cylindrical members being fitted together so that the smaller is within the outer member and the projections extend through the passages, a spring within the inner member extending between the end pieces of the cylindrical members and means for holding the parts together against force of the spring.

7. A valve structure comprising a hollow cylindrical outer member having an end piece at one end and the other end open, a second smaller inner cylindrical member having an end piece at one end and its other end open and projections at its open end, the outer member having passages in its end piece adapted for movement of said projections therethrough, said cylindrical members being fitted together so that the smaller is within the outer member and the projections extend through the passages, a spring within the inner member extending between the end pieces of the cylindrical members, said inner cylindrical member having passages in said projections and a retaining member extending therethrough and arranged outside the outer member to form a stop for movement of the smaller member due to force of the spring.

8. A valve structure having a port and a seat therefor, a valve element adapted to close said seat, a stationary outer member arranged over said valve element and seat, a movable element above said valve element arranged to form a stop for movement or lift of the valve element under normal pressures and movable under abnormal pressures, and a spacing member, interposed between the outer member and the movable member, the arrangement being such that by using spacing members of different size, the said lift of the valve element may be adjusted.

In testimony whereof I have affixed my signature.

WILLIAM D. COLLINS.